May 30, 1950 R. SACHTLEBER 2,509,886
INTERNAL THREAD MEASURING GAUGE
Filed Jan. 12, 1949

RUDOLPH SACHTLEBER
*INVENTOR.*
BY *Robert Meyer*
*Attorney*

Patented May 30, 1950

2,509,886

UNITED STATES PATENT OFFICE 2,509,886

INTERNAL THREAD MEASURING GAUGE

Rudolph Sachtleber, East Orange, N. J.

Application January 12, 1949, Serial No. 70,457

2 Claims. (Cl. 33—154)

This invention relates generally to an internal thread measuring gauge and in particular to a parallel movement lever actuated type of gauge for measuring the pitch diameter of internal threads.

The pitch of any type of thread is the distance from the center of one thread to the center of the next thread. The pitch or angle diameter of the thread whether it is on a tap, a screw or in a bore is the most important dimension and it is necessary that the pitch diameter be measured in addition to the outside diameter of a tap or screw thread or the inside diameter of a bore.

For external threads there are several well known methods of measuring in the angle of a thread as for example by a special screw thread micrometer adapted to fit the threads or by the three wire method. However, these methods do not adapt themselves for the measurement of internal threads due to the confinement of space and the difficulty of placing an instrument inside the bore in which the thread is located. As a result, the only well known method adapted for measuring internal pitch diameters is the plug type ring gauge. These gauges present serious difficulty however, particularly in securing proper contact pressure when a high degree of precision is required.

The present invention embodies an internal thread measuring gauge for measuring pitch diameters which relies on the motion of two parallel arms which may be regulated to whatever size is desirable and which may be adapted to fit large or small internal threads as will appear from the accompanying description.

Accordingly, it is an object of the present invention to provide an instrument which will measure the pitch diameter of internal threads.

It is another object of the present invention to provide an instrument which may be adapted to measure the pitch diameters of a wide range of internal threads of different diameters.

It is another object of the present invention to provide a gauge having parallel movement of the arms thereon which adapts it to fit into internal bores for the purpose of measuring threads therein.

It is a further object of the present invention to provide a gauge which may be easily constructed and which is relatively simple to operate and which requires relatively few manipulations and measuring aids to secure accurate results.

With these and other objects in view, as may appear from the accompanying specification, the invention consists of various features of construction and combination of parts, which will be first described in connection with the accompanying drawings showing an improved internal thread measuring gauge of a preferred form embodying the invention, and the features forming the invention will be specifically pointed out in the claims.

Figure 2:
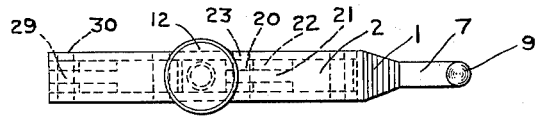
Figure 2 is a plan view of the invention.

Referring more particularly to the drawings, the internal thread measuring gauge 1 comprises an upper member or calipering bar 2 and a lower member or calipering bar 3 parallel to the upper member or calipering bar 2, and a third parallel member 4 located between the upper member 2 and the lower member or calipering bar 3. Two pairs of spaced levers 5 and 6 are movably connected to the upper member or calipering bar 2, the lower member or calipering bar 3 and the parallel member 4 and hold all three members in the same plane at all times.

The upper member or calipering bar 2 and the lower member 3 are of substantially elongated rectangular block-like construction and are identical in appearance. Each member is provided with extended portions 7 and 8 respectively. The extended portion 7 is adapted to receive a cone-shaped contact point or insert 9 which will engage the space between two threads contacting the edges but not the bottom of the said space. The extended portion 8 is adapted to receive a replaceable V-shaped contact element or insert 10 which will fit over a thread so as to contact the side portions thereof but not the topmost portion. The V-shaped insert 10 is replaceable to adapt the gauge 1 to be utilized for different types and sizes of threads. The cone shaped contact point or insert 9 and the V-shaped contact element or insert 10 is understood to be well known in the art and not considered to be part of the invention herein. The V-shaped recess in the contact element or insert 10 has its sides cut or angled to fit the pitch of the thread in the threaded bore to be measured.

In the preferred form of the invention as shown, the upper member or calipering bar 2 has a threaded bore 11 engaged by a thumbscrew or adjusting screw 12 therein which passes through the upper member or calipering bar 2 and the central portion of the parallel member 4 as is hereinafter described. The thumbscrew or adjusting screw 12 is pointed at its end 13 to fit a recess 14 in the lower member or calipering bar 3 to abut and move the upper and lower members in a direction away from each other when the thumbscrew 12 is turned in a clockwise direction. It is understood that while this type of motion transmitting means is shown, other types of motion transmitting devices embodying the same idea may be utilized for this purpose.

The pair of levers 5 and 6 which provide connecting means between the upper and lower members are identical in construction and operation. Reference to lever 5 will therefore serve to illustrate the construction and operation of both.

In the drawings, lever 5 comprises lever arms 15 and 16, one end of each of the lever arms 15 and 16 being connected to the upper member 2 and the lower member 3, respectively, milled slots or openings 17 and 18 being provided to receive the ends therein and press fitted pins 19 in each of the said members for attaching the ends thereto, so that the lever arms 15 and 16 can rotate in the milled openings 17 and 18 when the upper and lower members are moved away from each other. The other end of the lever arms 15 and 16 of lever 5 are connected to each other by a knuckle joint 20 comprising a tongue portion 21 on lever arm 15 and a fork portion 22 on the lever arm 16. The knuckle joint 20 is connected to the third parallel member 4 by a stud 23 which holds the third parallel member 4 in juxtaposition with the knuckle joint 20 so that there will be parallel movement with a minimum of play during the operation of the gauge and to provide a pivoting point for the lever arms 15 and 16 and the third parallel member 4.

Lever 6 having an identical construction comprises lever arms 24 and 25, press fitted pins 26 which hold the lever arms 24 and 25 to the upper and lower members, milled openings 27 and 28 also provided therein and knuckle joint 29 attached to the third parallel member 4 by a stud 30 as above described.

The third parallel member 4 located between the upper member 2 and the lower member 3 is of simple construction having two elongated flat side pieces 31 and 32 connected to each other by the studs 23 and 30 abovementioned and held in spaced relationship by the knuckle joints 20 and 29 which lie between the side pieces 31 and 32, thus forming an opening through which the thumbscrew 12 can freely pass to abut the lower member 3 as abovementioned.

The thumbscrew 12, the levers 5 and 6, and the third parallel member 4 operate in coordination to give the desired parallel movement to the upper member 2 and the lower member 3. Thus, as the thumbscrew 12 is turned in a clockwise direction the upper member 2 and the lower member 3 are forced away from each other. However, levers 5 and 6 attached to said upper and lower members must also move outwardly therewith. This is accomplished by the rotation of the lever arms 15, 16, 24 and 25 in the milled openings provided in the upper and lower members and the rotation and linear movement of the knuckle joints 20 and 29 and the third parallel member 4. The third parallel member 4 and the milled openings 17, 18, 27 and 28 hold the lever arms 15, 16, 24 and 25 and the knuckle joints 20 and 29 in the same plane so that as the lever arms rotate the knuckle joints 20 and 29 rotate and move inwardly carrying the third parallel member 4 therewith due to the attached studs 23 and 30 until the said studs are in alignment with the press fitted pins 19 and 26 around which the ends of the lever arms attached to the upper and lower arms are rotating. This is the maximum degree to which the upper and lower members may be moved. When it is desired to close the gauge or move the upper member 2 and the lower member 3 towards each other, the thumbscrew 12 is turned in a counterclockwise direction which backs the thumbscrew 12 off of the lower member. The gauge may now be closed by manual pressure on both the upper member 2 and the lower member 3 until it is in its minimum closure position as indicated in Figure 1 of the drawings.

Figure 6:
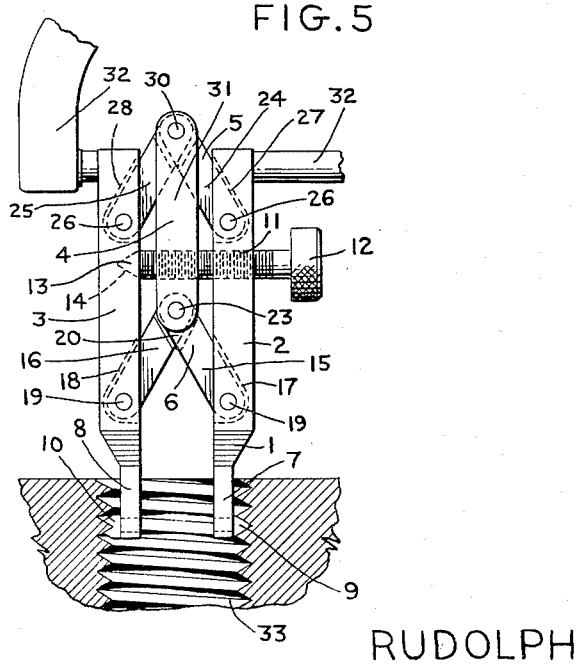
Figure 6 is an illustration of the invention in operation on an internal thread.

Figure 6 of the drawings indicates the gauge in operation and clearly shows the relationship between the parallel motion and the internal threads and indicates the ease and simplicity of operation and of measurement, a fragmentary view of a micrometer 32 being shown and its relative position for measuring the pitch diameter of an internal bore 33.

Figure 1:
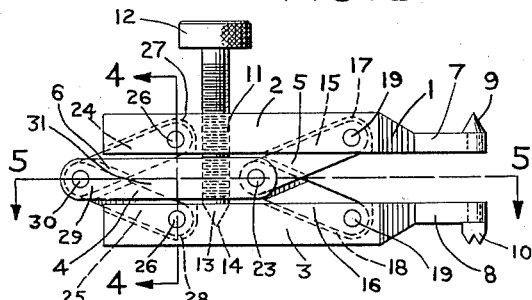
Figure 1 is a side elevation of the invention.
Figure 3:
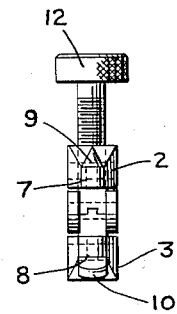
Figure 3 is an end view of the invention.
Figure 5:
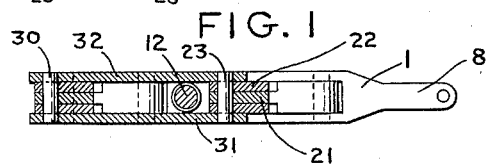
Figure 5 is a cross-section taken through line 5—5 of Figure 1.
Figure 4:
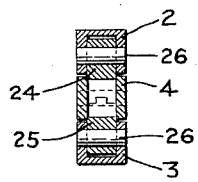
Figure 4 is a cross-section taken through line 4—4 of Figure 1.

Referring the operation to Figure 6, the gauge is reduced to its minimum position as shown in Figure 1, thereafter it is grasped manually and placed so that the extended portions 7 and 8 fall within the bore having internal threads to be measured. The thumbscrew 12 is then turned in a clockwise direction causing the arms to expand in parallel movement away from each other as above described until the cone-shaped insert 9 and the V-shaped insert 10 firmly but not tightly engage the threads of the bore as indicated in Figure 6. Thereafter a micrometer 32 indicated in Figure 6 is placed across the rearmost portion of the outer surfaces of the upper member 2 and the lower member 3, the measurement taken and the micrometer 32 locked. The gauge 1 may now be reduced by turning the thumbscrew in a counterclockwise direction and manually pressing the upper and lower members and removing it from the bore. The flat outer faces of the ends of the calipering bars 2 and 3 are accurately aligned with the tips of the contact point 9 and contact element 10, respectively, so that calipers used on the flat surfaces will accurately measure the distance between the tips of the contact point 9 and contact element 10 and, consequently, accurately measure the maximum diameter of the threaded bore being measured.

The calculations required are now relatively simple. In the preferred form as shown in the drawings the cone-shaped insert 9 and the V-shaped insert 10 are constructed and arranged so that the micrometer reading minus a predetermined constant which is fixed for the V-shaped members 10 will be the desired pitch diameter reading for the thread being measured. It is understood that the gauge may be constructed at all times so that the micrometer reading plus or minus a constant which can be predetermined by the position of the extended portions 7 and 8 and the inserts 9 and 10 will constitute the only calculation necessary to determine the pitch diameter being measured.

The purpose of locking the micrometer after the measurement is made is to prevent the reading from changing as little as possible because once the gauge 1 is removed from the internal bore by replacing it at the micrometer setting, by having the outermost surfaces of the upper member or calipering bar 2 and the lower member or calipering bar 3 contact the micrometer once again, a cross check can be made with an external thread measuring gauge or other type of external thread measuring means to insure accurate results.

It is further understood that the extended portions 7 and 8 and the size of the levers 5 and 6 and the other portions of the gauge 1 may be varied so that a series of gauges covering a wide range of bores may be made to be utilized for different bore sizes, and that the gauge may be made of any suitable material preferably a stainless steel alloy or other non-corrosive steel that will have good properties for a gauge of this type.

While one form of the invention has been illustrated and described it is obvious that those skilled in the art may vary the specific construction or arrangement of parts shown without departing from the spirit of the invention and therefore, it will be understood that it is not to be so limited but that it may be widely modified within the invention defined by the claims.

What is claimed is:

1. In an internal thread measuring gauge for measuring pitch diameters, an upper member provided with longitudinally aligned recesses on the inner surface thereof, a lower member having aligned recesses on the inner surface thereof opposite to those on said upper member, a first and a second lever adapted to impart parallel movement between said upper and lower members and including, a pair of lever arms on each of said levers, one end of each of said lever arms pivotally mounted for surface-to-surface movement in at least one of said recesses, the other ends of said lever arms disposed in recesses opposite each other forming a first and second knuckle joint between said members, a third member disposed between said upper and lower members, elongated sides forming said third parallel member and connected at the ends thereof to said first and second knuckle joints to form fulcrum points therewith whereby rigid parallel relationship between said members will be maintained, and threaded means on said upper member adapted to pass between said elongated sides and to abut said lower member for imparting movement thereto.

2. An internal thread measuring gauge as claimed in claim 1 wherein said elongated sides of the third member are parallel to each other and to the plane of movement of said upper and lower member whereby they are adapted to cooperate with the surface-to-surface support between said lever arms and their respective recesses.

RUDOLPH SACHTLEBER.

REFERENCES CITED

The following references are of record in the file of this patent:

UNITED STATES PATENTS

| Number | Name | Date |
|---|---|---|
| 351,363 | Dahlstrom | Oct. 26, 1886 |
| 375,688 | Whitehead | Dec. 27, 1887 |
| 672,493 | Raus | Apr. 23, 1901 |
| 925,807 | Green | June 22, 1909 |
| 1,129,705 | Messier | Feb. 23, 1915 |
| 1,237,992 | Austin | Aug. 21, 1917 |
| 1,265,544 | Stedman | May 7, 1918 |
| 1,402,497 | Hoffman | Jan. 3, 1922 |
| 1,515,943 | Engers | Nov. 18, 1924 |
| 2,212,884 | Polasik | Aug. 27, 1940 |

FOREIGN PATENTS

| Number | Country | Date |
|---|---|---|
| 17,918 | Germany | Nov. 13, 1881 |
| 677,564 | France | Dec. 18, 1929 |